United States Patent
Sarma (10) Patent No.: US 8,019,805 B1
(45) Date of Patent: Sep. 13, 2011

(54) APPARATUS AND METHOD FOR MULTIPLE PASS EXTENDED PRECISION FLOATING POINT MULTIPLICATION

(75) Inventor: Debjit Das Sarma, San Jose, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 2545 days.

(21) Appl. No.: 10/730,800

(22) Filed: Dec. 9, 2003

(51) Int. Cl.
*G06F 7/52* (2006.01)
*G06F 7/44* (2006.01)

(52) U.S. Cl. .................. 708/627; 708/503; 708/629

(58) Field of Classification Search .................. 708/503, 708/625, 361, 632, 631, 627, 629
See application file for complete search history.

(56) References Cited

U.S. PATENT DOCUMENTS

| | | | |
|---|---|---|---|
| 5,184,318 A | 2/1993 | Briggs et al. | |
| 5,220,525 A | 6/1993 | Anderson et al. | |
| 5,675,527 A * | 10/1997 | Yano | 708/628 |
| 5,872,948 A | 2/1999 | Mallick et al. | |
| 6,004,022 A * | 12/1999 | Tsubakihara | 708/628 |
| 6,144,979 A * | 11/2000 | Song et al. | 708/620 |
| 6,226,737 B1 | 5/2001 | Elliott et al. | |

OTHER PUBLICATIONS

Jessani, et al, "The Floating-Point Unit of the PowerPC 603e Microprocessor", *IBM J. Res. Develop.*, vol. 40, No. 5, Sep. 1996, International Business Machines Corporation.
Briggs, et al, "A 17×69 Bit Multiply and Add Unit with Redundant Binary Feedback and Single Cycle Latency", IEEE, 1993, 1063-688/93.

* cited by examiner

*Primary Examiner* — Chuong D Ngo
(74) *Attorney, Agent, or Firm* — Meyertons, Hood, Kivlin, Kowert & Goetzel, P.C.

(57) ABSTRACT

A floating point multiplier circuit includes partial product generation logic configured to generate a plurality of partial products from multiplicand and multiplier values. The plurality of partial products corresponds to a first and second portion of the multiplier value during respective first and second partial product execution phases. The multiplier also includes a plurality of carry save adders configured to accumulate the plurality of partial products generated during the first and second partial product execution phases into a redundant product during respective first and second carry save adder execution phases. The multiplier further includes a first carry propagate adder coupled to the plurality of carry save adders and configured to reduce a first and second portion of the redundant product to a multiplicative product during respective first and second carry propagate adder phases. The first carry propagate adder phase begins after the second carry save adder execution phase completes.

9 Claims, 5 Drawing Sheets

APPARATUS AND METHOD FOR MULTIPLE PASS EXTENDED PRECISION FLOATING POINT MULTIPLICATION

BACKGROUND OF THE INVENTION

1. Field of the Invention

This invention relates to computer arithmetic and, more particularly, to floating point multiplication hardware.

2. Description of the Related Art

Many general purpose microprocessors and other types of processors such as digital signal processors perform arithmetic computations, such as addition, subtraction, multiplication, and division. Often, such computations are performed on operands that are defined to be integer values. However, the numerical range of a given 2's complement integer of N bits is from $-(2^N)$ to $2^N-1$. This range may be insufficient for some applications, such as scientific modeling applications, which may need to manipulate real numbers across a wide numerical range.

To provide greater flexibility in representing real quantities, numerous floating point number formats have been defined. One such format, designated IEEE 754, defines a signed single-precision floating point value including 24 mantissa bits and 8 exponent bits, a signed double-precision floating point value including 53 mantissa bits and 11 exponent bits, and a signed extended-precision floating point value including 64 mantissa bits and 15 exponent bits. The IEEE 754 format enables representation of a much wider numerical range than a 2's complement integer format: for example, single precision range is approximately $+/-2^{-126}$ to $+/-2^{127}$ and double precision range is approximately $+/-2^{-1022}$ to $+/-2^{1023}$.

While real number arithmetic using floating point number formats may be emulated by software performing integer computations, such emulation may be unacceptably slow for a given application. Therefore, many general purpose microprocessors and other processor types include hardware support for floating point number formats such as IEEE 754. Such support may include providing a floating point execution unit configured to perform operations such as multiplication, addition, and more complex numerical functions using floating point format operands. Processors including hardware floating point support may greatly improve the performance of applications programmed to use floating point data.

Floating point arithmetic performance improvement through hardware support may come at a substantial cost, however. In some implementations that use iterative floating point multiplications to approximate floating point division and transcendental functions, additional bits of precision may be added to the mantissa value for multiplication operations to ensue that the resulting division and transcendental functions have the desired level of precision. For example, to provide 64-bit precision of results for transcendental functions, it may be necessary to provide hardware support for 76-bit by 76-bit multiplication. However, hardware to support such a multiplication may require over five times the device count and die area of a 32-bit by 32-bit integer multiplier.

In addition to potentially increasing overall processor die size and therefore manufacturing costs, increased area due to floating point operation support may result in a substantial increase in total processor power consumption. As processor clock frequencies and power requirements continue to increase, chip packaging and system designs capable of supplying higher power demands and dissipating excess heat may become costlier. Therefore, careful management of chip power consumption through microarchitecture and design choices in floating point logic and other functional areas may become an increasingly important aspect of a successful processor design.

SUMMARY OF THE INVENTION

Various embodiments of a floating point multiplier circuit are disclosed. In one embodiment, the multiplier circuit may be configured for performing extended-precision multiplication of an N-bit multiplicand value by an M-bit multiplier value, wherein N and M are positive integers. The multiplier circuit may include partial product generation logic configured to generate a plurality of partial products from the multiplicand and multiplier values. The plurality of partial products may correspond to a first portion of the multiplier value during a first partial product execution phase, and to a second portion of the multiplier value during a second partial product execution phase.

The multiplier circuit may also include a plurality of carry save adders coupled to the partial product generation logic. The carry save adders may be configured to accumulate the plurality of partial products generated during the first partial product execution phase into a redundant product during a first carry save adder execution phase, as well as to accumulate the plurality of partial products generated during the second partial product execution phase into the redundant sum during a second carry save adder execution phase.

The multiplier circuit may further include a first carry propagate adder coupled to the plurality of carry save adders and configured to reduce a first portion of the redundant product to a multiplicative product during a first carry propagate adder phase, as well as to reduce a second portion of the redundant product to the multiplicative product during a second carry propagate adder phase. The first carry propagate adder phase may begin after the second carry save adder execution phase completes.

In one specific implementation, the plurality of carry save adders may be further configured to perform an arithmetic left shift on the redundant product accumulated during the first carry save adder execution phase by a number of bits corresponding to the first portion of the multiplier value, as well as to accumulate a result of the arithmetic left shift with the second portion of the plurality of partial products into the redundant product during the second carry save adder execution phase.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
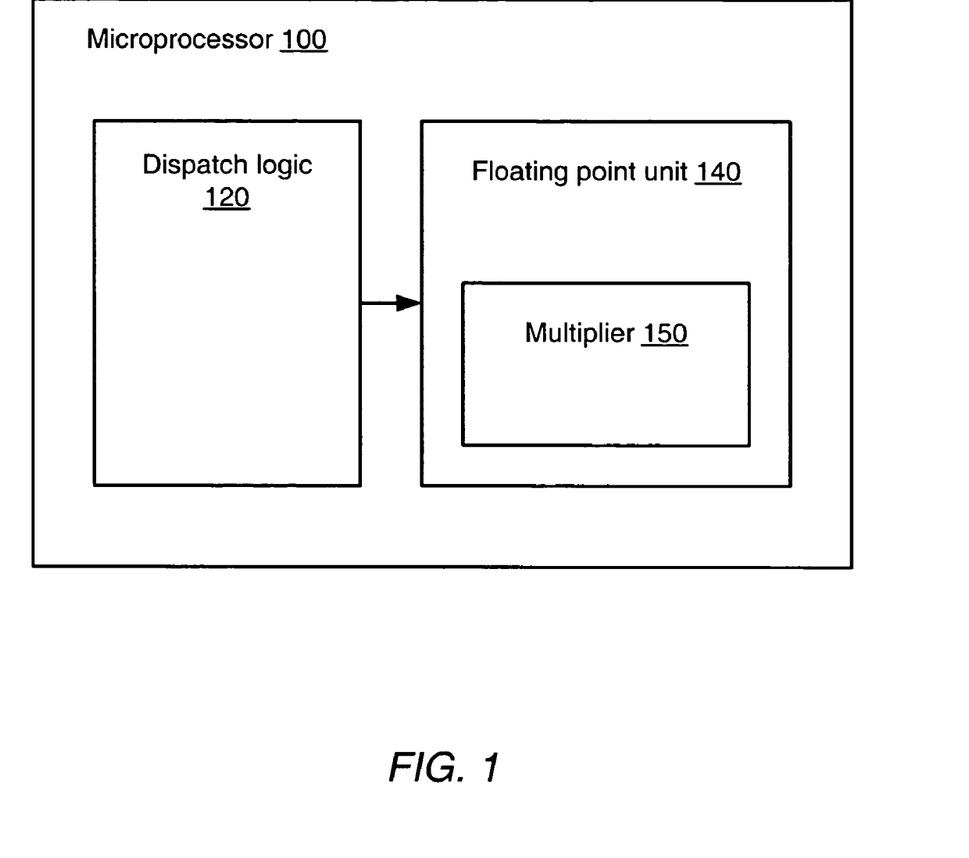
FIG. 1 is a block diagram of one embodiment of an exemplary microprocessor.

Turning now to FIG. 1, a block diagram of one embodiment of an exemplary microprocessor is shown. Microprocessor 100 may be configured to execute instructions stored in a system memory (not shown). Many of these instructions may operate on data stored in the system memory. It is noted that the system memory may be physically distributed throughout a computer system and may be accessed by one or more microprocessors such as microprocessor 100, for example. In one embodiment, microprocessor 100 is an example of a microprocessor that implements the x86 architecture such as an Athlon™ processor, for example. However, other embodiments are contemplated that include other types of microprocessors.

In the illustrated embodiment, microprocessor 100 includes dispatch logic 120 coupled to floating point unit 140. In one embodiment, dispatch logic 120 may include instruction fetch logic configured to fetch instructions from system memory or an instruction cache (not shown), decode logic configured to decode fetched instructions, and scheduling logic configured to issue decoded instructions to various instruction execution units. In other embodiments, instruction fetch logic and decode logic may be implemented in units other than dispatch logic 120. In the illustrated embodiment, dispatch logic 120 may be configured to issue instructions to floating point unit 140 such as floating point multiply and divide instructions.

Floating point unit 140 includes a floating point multiplier 150 and may include additional logic, such as a floating point adder and exponent adjustment logic (not shown). Floating point unit 140 may be configured to receive floating point instructions and to execute floating point operations such as addition, multiplication, and evaluation of transcendental functions (e.g., trigonometric and logarithmic functions) in response to such instructions.

Figure 2:
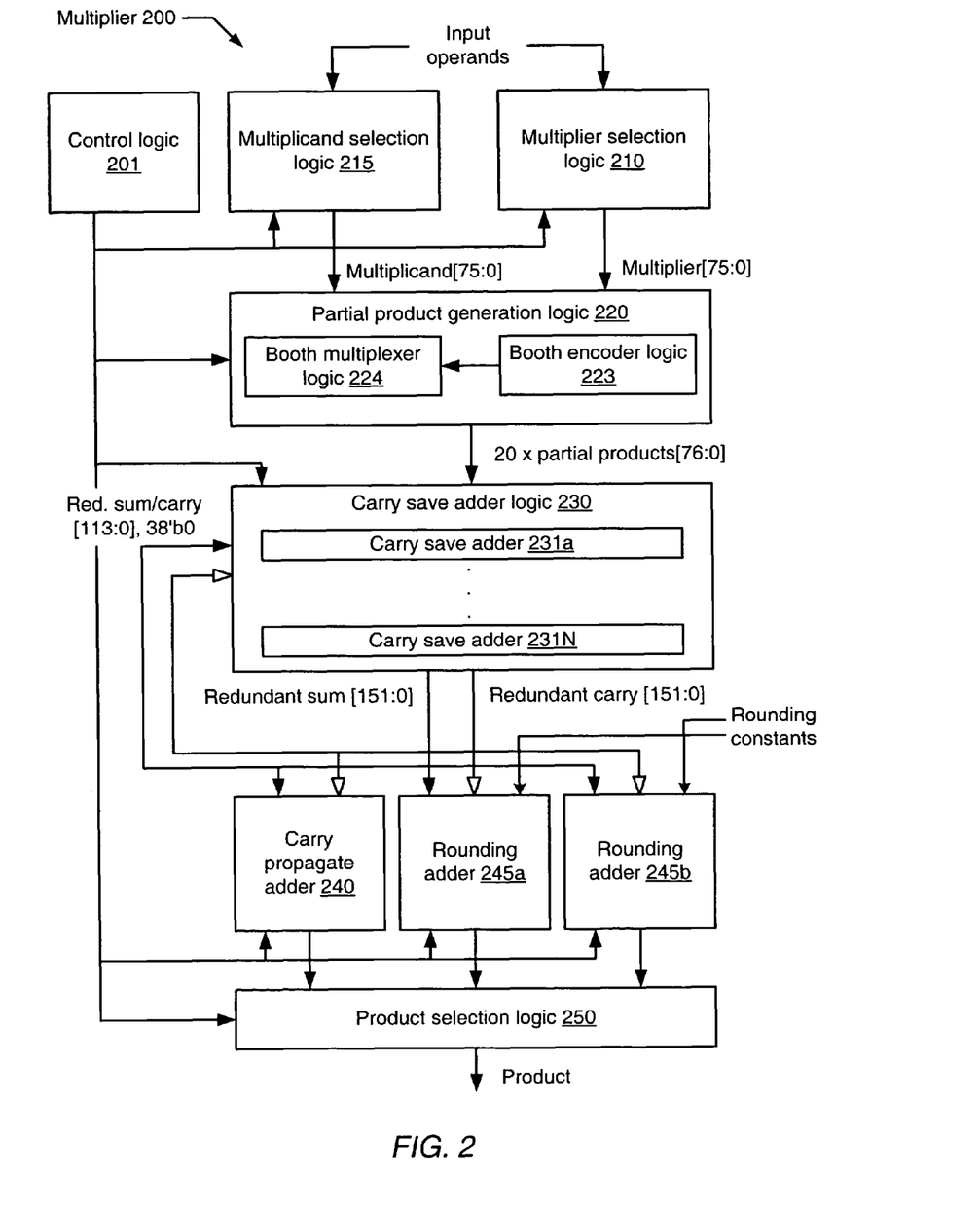
FIG. 2 is a block diagram of one embodiment of a floating point multiplier.

Referring to FIG. 2, a block diagram of one embodiment of a floating point multiplier is shown. Multiplier 200 may be illustrative of multiplier 150 of FIG. 1. Multiplier 200 includes multiplier selection logic 210 and multiplicand selection logic 215, each coupled to receive one or more input operands and each coupled to partial product generation logic 220. Multiplier 200 further includes carry save adder logic 230 coupled to receive partial products from partial product generation logic 220 and to provide redundant sum and carry terms to carry propagate adder 240 and to a plurality of rounding adders 245a and 245b, as well as to feed a portion of the redundant sum and carry terms back into partial product generation logic 220 as inputs. Each rounding adder 245a and 245b is further coupled to receive a respective rounding constant. Product selection logic 250 is coupled to carry propagate adder 240 and rounding adders 245a and 245b to select a final multiplicative product. Control logic 201 is coupled via a variety of interconnect mechanisms to control the operation of each of the aforementioned units. In other embodiments, multiplier 200 may include other numbers of rounding adders 245, each coupled to receive a respective rounding constant.

Operand Selection and Partial Product Generation

Multiplier selection logic 210 may be configured to select a multiplier value from one or more input operands. In one embodiment, multiplier selection logic 210 may include multiplexer logic configured to select a multiplier value from a plurality of data sources, such as a register file (not shown), an integer bypass unit (not shown), or a floating point bypass unit (not shown), for example. In such an embodiment, multiplier selection logic 210 may further include data formatting logic configured for translating the format of an input operand, such as from an integer format to a single-precision or double-precision floating point format, for example. In the illustrated embodiment, multiplier selection logic 210 produces a 76-bit multiplier value denoted multiplier[75:0]. However, it is contemplated that in other embodiments, multiplier selection logic 210 may be configured to produce multiplier values including different numbers of bits.

Multiplicand selection logic 215 may be configured to select a multiplicand value from one or more input operands. In one embodiment, multiplicand selection logic 215 may include multiplexer logic configured to select a multiplicand value from a plurality of data sources, such as a register file (not shown), an integer bypass unit (not shown), or a floating point bypass unit (not shown), for example. In such an embodiment, multiplicand selection logic 215 may further include data formatting logic configured for translating the format of an input operand, such as from an integer format to a single-precision or double-precision floating point format, for example. In the illustrated embodiment, multiplicand selection logic 215 produces a 76-bit multiplicand value denoted multiplicand[75:0]. However, it is contemplated that in other embodiments, multiplicand selection logic 215 may be configured to produce multiplicand values including different numbers of bits.

Partial product generation logic 220 may be configured to generate a plurality of partial products from the multiplier and multiplicand values received from multiplier selection logic 210 and multiplicand selection logic 215, respectively. In the context of multiplication, a partial product refers to the quantity resulting from first multiplying the multiplicand value by a given digit of the multiplier value and then shifting the resulting value left by the number of places corresponding the given digit. The resulting partial products may then be summed to yield the full multiplicative product. In one embodiment, partial products may be generated for binary multiplication of an N-bit multiplicand value by an M-bit multiplier value by simply replicating the multiplicand value M times, shifting each replicated multiplicand value left by the number of bits corresponding to a respective bit of the multiplier value, and multiplying each shifted multiplicand value by the corresponding respective multiplier value bit value. In binary arithmetic, multiplying a value by a given bit is equivalent to performing a logical AND function between each bit of the value and the given bit. Thus in the embodiment just described, M partial products are produced, each corresponding to a shifted version of either the multiplicand or the value 0.

In the illustrated embodiment, partial product generation logic 220 includes Booth encoder logic 223 coupled to Booth multiplexer logic 224. Booth encoder logic 223 and Booth multiplexer logic 224 may be configured to implement a radix-4 Booth recoding algorithm. In such an algorithm, a given partial product may be formed by examining a pair of bits of the multiplier value along with the next least significant bit relative to the pair. The partial product may then be determined as follows: If the three examined bits of the multiplier value are equal to 000 or 111, the corresponding partial product is equal to zero. If the three examined bits are equal to 001 or 010, the corresponding partial product is equal to the multiplicand value. If the three examined bits are equal to 101 or 110, the corresponding partial product is equal to the arithmetic negation or two's complement of the multiplicand value. If the three examined bits are equal to 011, the corresponding partial product is equal to two times the multiplicand value, or the multiplicand value shifted left by one bit. If the three examined bits are equal to 100, the corresponding partial product is equal to the arithmetic negation of two times the multiplicand value. For signed multiplication, the radix-4 Booth recoding algorithm yields M/2 partial products each shifted to correspond to the least significant bit of the corresponding multiplicand bit pair. For unsigned multiplication, the radix-4 Booth recoding algorithm requires an additional partial product term formed by prepending zeros to the multiplier value to form an additional bit pair, the most significant bit of which is guaranteed to be zero.

In the illustrated embodiment, Booth encoder logic 223 may be configured to examine bit pairs of the multiplier value to determine which Booth recoding case applies to the corresponding partial product. Booth encoder logic 223 may further be configured to cause Booth multiplexer logic 224 to select the appropriate form of the multiplicand value corresponding to a given partial product, as described above.

Partial product generation logic 220 may be configured to produce partial products as described above in portions during distinct execution phases, each referred to herein as a partial product execution phase. In the illustrated embodiment, partial product generation logic 220 may be configured to generate a first portion of partial products corresponding to the most significant half of the multiplier value, or multiplier [75:38], during a first partial product execution phase, and to generate a second portion of partial products corresponding to the least significant half of the multiplier value, or multiplier[37:0], during a second partial product execution phase. Thus, in each partial product execution phase of the illustrated embodiment, partial product generation logic 220 may generate 20 partial products corresponding to a respective half of the multiplier value and including an additional partial product to support unsigned multiplication as described above. Further, Booth encoder logic 223 may be configured to include only the logic necessary to encode the bits of the multiplier value corresponding to the partial products actually generated during a given partial product execution phase. For example, in the illustrated embodiment, Booth encoder logic 223 may be configured to include only the logic necessary to encode 38 bits of the multiplier, plus one additional partial product to support unsigned multiplication, corresponding to the 20 partial products produced in each partial product execution phase.

It is contemplated that in other embodiments, a different number of partial product execution phases may be used to generate a different number of partial products. It is further contemplated that in other embodiments, the partial products may be generated in a different order from different portions of the multiplier value. For example, in one alternative embodiment, partial products corresponding to the low half of the multiplier value may be generated prior to those corresponding to the high half of the multiplier value. As another example, in another alternative embodiment, the portions of the multiplier used during partial product generation may be asymmetric, with a larger portion used during one partial product execution phase, and a smaller portion used during another partial product execution phase.

Carry Save Adder Logic

Carry save adder logic 230 may be configured to accumulate partial products received from partial product generation logic 220. In the illustrated embodiment, carry save adder logic 230 includes a plurality of carry save adders (CSAs) numbered 231*a* through 231N. For simplicity of reference, carry save adder 231 may be used herein to refer to an individual carry save adder or to the plurality of carry save adders. N may be any character or combination of characters; correspondingly, carry save adder logic 230 may include an arbitrary number of carry save adders 231.

Generally speaking, a carry save adder (CSA) is an adder configured to receive a plurality of inputs of equal numeric weight, such as a plurality of partial product bits corresponding to a single bit position of a multiplicative product, and to produce a plurality of outputs of differing numeric weight. In one embodiment, a CSA may be configured to receive four input values and a carry in value, each of equal numeric weight N, and to produce two output values, a sum of numeric weight N and a carry of numeric weight 2N as well as a carry out value of numeric weight 2N. Such a CSA embodiment may be referred to as a 4:2 CSA, reflecting the fact that it consumes four input values and produces two output values, exclusive of the carry in and carry out values. In many embodiments, CSAs may be configured to reduce or compress a larger number of input values to a smaller number of output values and may thus be referred to as compressors or counters. Other CSA embodiments are contemplated that may be configured to receive different numbers of inputs and produce different numbers of outputs, such as 3:2 CSAs and 5:3 CSAs. CSAs configured to receive fewer inputs may be referred to as lower-order CSAs, while CSAs configured to receive more inputs may be referred to as higher-order CSAs.

In one embodiment, a first subset of carry save adders 231 may be coupled to receive the plurality of partial products generated by partial product generation logic 220 and to produce a first set of reduced partial products representing a partial accumulation of the received partial products. A second subset of carry save adders 231 may be coupled to receive the first set of reduced partial products and produce a second set of reduced partial products representing a partial accumulation of the first set. This process may be repeated up to a final subset of carry save adders 231 coupled to receive a penultimate set of reduced partial products and configured to produce a redundant form product value, or a redundant product. As used herein, a redundant form encoding refers to a data encoding format for a value that includes more than one data bit per bit of the encoded value, for at least a subset of bits of the encoded value. For example, the final subset of carry save adders 231 may produce a redundant product as a redundant sum value and a redundant carry value. The redundant sum and redundant carry values may be summed to obtain the multiplicative product, as described below.

Generally speaking, the number of CSAs required to accumulate a given set of partial products to a final redundant form value depends on the configuration of CSAs used. If higher-order CSAs are used, fewer CSAs may be required than if lower-order CSAs are used. However, higher-order CSAs may be logically more complex and more difficult to design and use than lower-order CSAs. In one embodiment, carry save adder logic 230 may include five subsets of carry save adders 231, including a mixture of 4:2 CSAs and 3:2 CSAs, each subset configured to provide a partial accumulation to the next. In other embodiments, other numbers of subsets including different types of CSAs may be used. In the illustrated embodiment, carry save adder logic 230 is configured to produce a 152-bit redundant sum value and a 152-bit redundant carry value. However, in other embodiments it is contemplated that different redundant encodings including different numbers of bits may be employed.

Carry save adder logic 230 may be configured to produce redundant sum and carry values as described above in portions during distinct execution phases, each referred to herein as a carry save adder execution phase. In the illustrated embodiment, carry save adder logic 230 may be configured to accumulate the partial products generated during the first partial product execution phase described above into a redundant product during a first carry save adder execution phase. Carry save adder logic 230 may also be configured to accumulate the partial products generated during the second partial product execution phase described above into the redundant product during a second carry save adder execution phase. Carry save adder logic 230 may further be configured to perform an arithmetic left shift of the redundant product produced during the first carry save adder phase by the number of bits corresponding to the first portion of the multiplier value used to generate partial products during the first partial product execution phase, described above. The resulting shifted redundant product may then be coupled to an input of carry save adder logic 230 and accumulated into the redundant product produced during the second carry save adder execution phase, along with the partial products produced during the second partial product execution phase.

In the illustrated embodiment, partial products corresponding to multiplicand[75:0] and multiplier[75:38] may be produced during the first partial product execution phase. During the first carry save adder execution phase, these partial products may be accumulated to form redundant sum[113:0] and redundant carry[113:0] values. These redundant sum and carry values may then be arithmetically shifted left by 38 bits and fed back to the inputs of carry save adder logic 230. During the second partial product execution phase, partial products corresponding to multiplicand[75:0] and multiplier [37:0] may be produced. During the second carry save adder execution phase, these partial products may be accumulated with the shifted redundant sum and carry values to form redundant sum[151:0] and redundant carry[151:0] values. It is contemplated that in other embodiments, a different number of carry save adder execution phases may be used to generate a redundant product that may be encoded differently. It is further contemplated that in other embodiments, the partial products may be accumulated in a different order. For example, in one alternative embodiment, partial products corresponding to the low half of the multiplier value may be accumulated prior to those corresponding to the high half of the multiplier value.

Carry Propagate Adder, Rounding Adders, and Product Selection Logic

Carry propagate adder 240 may be configured to perform fast addition of the redundant sum and carry values produced by carry save adder logic 230 to form an unrounded version of the multiplicative product. In one embodiment, carry propagate adder 240 may be implemented as a carry lookahead adder, while in other embodiments, other adder architectures may be employed. Carry propagate adder 240 may be configured to reduce the redundant sum and carry values to a multiplicative product during distinct execution phases, each referred to herein as a carry propagate adder execution phase. In the illustrated embodiment, carry propagate adder 240 may be configured to reduce a first portion of the redundant product to a multiplicative product during a first carry propagate adder execution phase, and to reduce a second portion of the redundant product to the multiplicative product during a second carry propagate adder execution phase. In other embodiments, a different number of carry propagate adder execution phases may be used. It is noted that in some embodiments, where the unrounded multiplicative product is not desired (for example, in embodiments that process denormal results entirely in software), carry propagate adder 240 may be omitted.

In the illustrated embodiment, carry propagate adder 240 may be configured to receive the lower 76-bit portion of the redundant sum and carry values and to sum them during the first carry propagate adder execution phase, producing the lower 76 bits of the multiplicative product as well as a carry out signal. Carry propagate adder 240 may further be configured to receive the upper 76-bit portion of the redundant sum and carry values and to sum them along with the carry out signal produced during the first carry propagate adder execution phase during the second carry propagate adder execution phase, producing the upper 76 bits of the multiplicative product. Thus, in the illustrated embodiment, carry propagate adder 240 may be implemented using fewer resources than an adder configured to add the full 152-bit redundant sum and carry signals in a single execution phase, thereby advantageously reducing area requirements and power consumption. It is noted that in alternative embodiments, carry propagate adder 240 may be configured to sum different portions of a differently sized redundant product during a different number of carry propagate adder execution phases.

In the illustrated embodiment, the higher-order portion of the multiplier value may be used to generate higher-order partial products before the lower-order portion of the multiplier value is used to generate lower-order partial products. Consequently, the higher-order portion of the redundant product may be generated before the lower-order portion. During reduction of the redundant product to the multiplicative product in carry propagate adder 240, however, there may be a carry out produced during processing of the lower-order portion of the redundant product that may need to be propagated into the higher-order portion of the multiplicative product. Therefore, the first carry propagate adder execution phase may not begin until after the second carry save adder execution phase completes.

Like carry propagate adder 240, rounding adders 245*a* and 245*b* (which may be referred to collectively herein as rounding adders 245) may be configured to perform fast addition of the redundant sum and carry values produced by carry save adder logic 230 to form the multiplicative product. Additionally, however, each of rounding adders 245 may be configured to receive a respective rounding constant and to accumulate the respective rounding constant along with the redundant sum and carry values during the first carry propagate adder execution phase. Rounding adders 245 may thereby be configured to produce a respective plurality of rounded multiplicative products. In one embodiment, each of rounding adders 245 may be implemented as a 3:2 CSA followed by a carry lookahead adder. However, in other embodiments, other adder architectures may be employed. In the illustrated embodiment, each of rounding adders 245 may be configured to reduce a first portion of the redundant product along with a respective rounding constant to a rounded redundant product, then reduce the rounded redundant product to a rounded multiplicative product during a first carry propagate adder execution phase. Each of rounding adders 245 may also be configured to reduce a second portion of the rounded redundant product to the multiplicative product during a second carry propagate adder execution phase. In other embodiments, a different number of carry propagate adder execution phases may be used.

In the illustrated embodiment, rounding adder 245a may be configured to receive the lower 76-bit portion of the redundant sum and carry values and to sum them during the first carry propagate adder execution phase along with a first 152-bit rounding constant that rounds the multiplicative product assuming the summation does not overflow, thereby producing the lower 76 bits of a first rounded multiplicative product as well as a carry out signal. Rounding adder 245a may further be configured to receive the upper 76-bit portion of the redundant sum and carry values and to sum them along with the carry out signal produced during the first carry propagate adder execution phase during the second carry propagate adder execution phase, producing the upper 76 bits of the first rounded multiplicative product. Rounding adder 245b may be configured to produce a second rounded multiplicative product in the same fashion as rounding adder 245a, but using a second 152-bit rounding constant that rounds the multiplicative product assuming the summation does overflow. Different rounding constants may be used for different types of multiplication, such as single precision, double precision, or transcendental support, for example, to ensure that rounding takes place at the correct digit of the multiplicative product. In the illustrated embodiment, two rounded multiplicative products may be produced by rounding adders 245, while each of rounding adders 245 may be implemented using fewer resources than an adder configured to add the full 152-bit redundant sum and carry signals along with a 152-bit rounding constant in a single execution phase, thereby advantageously reducing area requirements and power consumption. It is noted that in alternative embodiments, rounding adders 245 may be configured to sum different portions of a differently sized redundant product during a different number of carry propagate adder execution phases.

Product selection logic 250 may be configured to select the multiplicative product produced by carry propagate adder 240 or one of the rounded multiplicative products produced by rounding adders 245 as the final multiplicative product. In the illustrated embodiment, product selection logic 250 may select the final multiplicative product under the direction of control logic 201. For example, control logic 201 may detect that a denormalized result has been produced, and may direct product selection logic 250 to select the multiplicative product produced by carry propagate adder 240 as the final multiplicative product. Alternatively, control logic 201 may detect that an overflow condition has or has not occurred, and may direct product selection logic 250 to select the appropriate rounded multiplicative product from rounding adders 245 as the final multiplicative product.

Partial Product Sign Extension

In some embodiments of multiplier 200, signed partial products may be produced by partial product generation logic 220. For example, the Booth algorithm produces signed partial products whether the multiplication is signed or unsigned. Since partial products may be aligned to different bit positions of the multiplicative product, signed partial products may need to be sign-extended for their accumulation to be arithmetically correct.

Literally sign extending each partial product by appending a plurality of sign bits to it may increase the size and complexity of carry save adder logic 230. Therefore, alternative algorithms for correctly accumulating signed partial products may be employed. One such algorithm requires logically complementing (i.e. 1's complementing) the sign bit of each partial product and appending a logical 1 as the most significant bit of each partial product. A logical 1 is then added to the sign bit of the first (i.e. least significant) partial product. When accumulated, signed partial products produced by this algorithm will produce an arithmetically correct multiplicative product. However, the multiplicative product will contain a spurious logical 1 value to the left of its most significant bit (i.e., a spurious carry out).

Ordinarily, such a spurious carry out may be truncated and ignored. However, in multiplier 200, the output of carry save adder logic 230 may be shifted and fed back into carry save adder logic 230 for further accumulation. Also, in some embodiments, carry save adder logic 230 produces a redundant product value in sum and carry form as described above. In such a redundant encoding, the spurious carry may be implicit in the redundant sum and carry values. If the spurious carry is not corrected, erroneous results may occur. The spurious carry may be corrected by subtracting a logical 1 value from the bit position in which the spurious carry would be added after any shifting of the redundant product value. In one embodiment, this subtraction may be implemented by providing an additional correction term that arithmetically represents subtracting a logical 1 value from the appropriate bit position. In two's complement format, such a term would consist of a series of logical 1s beginning at the appropriate bit position and extending to the most significant product bit position. This term may then be conditionally summed with the partial products in carry save adder logic 230. In an alternative embodiment, if carry propagate adder 240 is not implemented, the correction term may be conditionally combined with the rounding constants supplied to each rounding adder 245.

Pipelining

It is noted that in some embodiments, multiplier 200 may be implemented in a pipelined fashion and may include a plurality of pipeline registers (not shown). For example, in one embodiment, multiplier selection logic 210, multiplicand selection logic 215, and partial product generation logic 220 may together comprise a first pipeline stage bounded by pipeline registers. Similarly, carry save adder logic 230 may comprise a second pipeline stage, carry propagate adder 240 and rounding adders 245 may comprise a third pipeline stage, and product selection logic 250 may comprise a fourth pipeline stage. In an alternative embodiment, some units of multiplier 200 may span more than one pipeline stage. For example, to avoid implementing a pipeline register for each bit of each partial product generated by partial product generation logic 220, as well as to balance the depth of logic in each pipeline stage, a first subset of carry save adders 231 may be associated with the first pipeline stage described above. The remaining carry save adders 231 may be associated with the second pipeline stage. In other embodiments, it is contemplated that a different number of logic partitionings over a different number of pipeline stages may be employed.

In a pipelined embodiment of multiplier 200, the various execution phases described above may correspond to respective pipeline stages. For example, one embodiment may include first and second partial product pipeline stages, first and second carry save adder pipeline stages, first and second carry propagate adder pipeline stages, and a product selection pipeline stage. As noted above, in some embodiments each pipeline stage may correspond exactly to a given logic function, while in other embodiments some logic functions may span multiple pipeline stages.

As described in greater detail below in conjunction with the description of FIG. 4, in one embodiment, multiplier 200 may be configured under the direction of control logic 201 to perform pipelined reduced-precision multiplication of an N-bit multiplicand value by an S-bit multiplier value, where S is a positive integer less than or equal to N/2. In such an embodiment, a single partial product execution phase, a single carry save adder execution phase, and a single carry propagate adder phase may be used. Further, each such phase may correspond to a respective pipeline stage, such that each such phase may receive a new reduced-precision multiplication operation during a given execution cycle.

Figure 3:
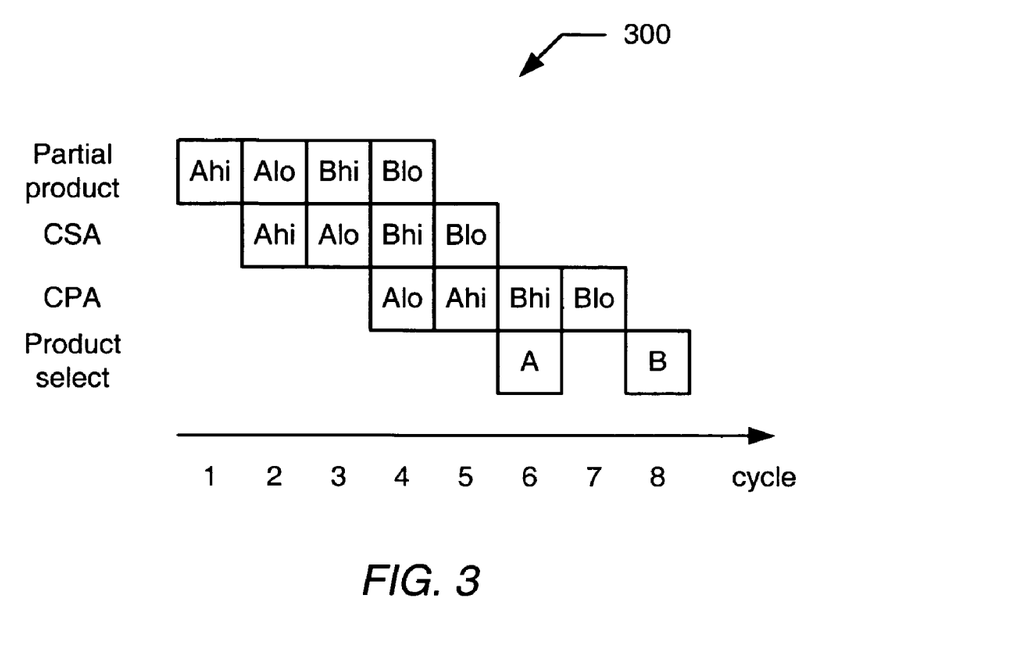
FIG. 3 is a pipeline diagram illustrating the flow of extended-precision multiplication operations through one embodiment of a floating-point multiplier.

Turning now to FIG. 3, a pipeline diagram illustrating the flow of extended-precision multiplication operations through one embodiment of a floating-point multiplier is shown. Pipeline diagram 300 depicts four pipeline stages along the vertical axis denoted "partial product," "CSA," "CPA," and "product select." These pipeline stages may correspond to stages and phases of multiplier 200 execution as described above. Pipeline diagram 300 depicts a progression of clock cycles along the horizontal axis and illustrates the progression in time of two multiplication operations denoted "A" and "B," each configured to multiply an N-bit multiplicand value by an M-bit multiplier value. For clarity of explanation, the following discussion assumes that the execution phases described above correspond directly to respective pipeline stages. However, as noted above, in alternative embodiments a given pipeline stage may correspond to portions of more than one of the above-described execution phase.

Referring collectively to FIG. 2 and FIG. 3, in cycle 1 of pipeline diagram 300, multiplication A enters the first partial product execution phase and is denoted "Ahi". During this phase, partial products corresponding to the upper portion of multiplication A's multiplier value may be generated. In cycle 2, multiplication A enters the second partial product execution phase and is denoted "Alo". During this phase, partial products corresponding to the lower portion of multiplication A's multiplier value may be generated. Concurrent with generation of the lower partial products, in the embodiment illustrated by pipeline diagram 300, the upper partial products generated during the first partial product execution phase may enter the first carry save adder execution phase during cycle 2 ("Ahi"). In an alternative embodiment, the first carry save adder execution phase may not overlap with the second partial product execution phase.

During cycle 3, the redundant product formed during the first carry save adder execution phase may be arithmetically shifted left and fed back into carry save adder logic 230 as described above for accumulation along with the lower partial products ("Alo"). Cycle 3 corresponds to the second carry save adder execution phase for multiplication A. The full redundant product may be available at the completion of cycle 3.

During cycle 4, multiplication A enters the first carry propagate adder execution phase, during which a lower portion of the redundant product may be reduced to the multiplicative product in carry propagate adder 240 as well as to a plurality of rounded multiplicative products in rounding adders 245 ("Alo"). Likewise, during cycle 5, multiplication A enters the second carry propagate adder execution phase, during which an upper portion of the redundant product may be reduced to the multiplicative and rounded multiplicative products ("Ahi"). It is noted that in the illustrated embodiment, the first carry propagate adder execution phase begins after the second carry save adder execution phase, owing to the dependence of the carry propagate addition on the generation of the lower portion of the redundant product. Finally, in cycle 6, multiplication A enters the product selection phase, wherein one of the multiplicative products generated in cycle 5 may be selected as the final multiplicative product.

Pipeline diagram 300 shows multiplication B entering the pipeline immediately following A, and following the same sequence of execution phases. However, multiplication B may enter the pipeline at any time after multiplication A. In the illustrated embodiment, the latency of each extended-precision multiplication operation is six cycles, and the maximum throughput of such operations is ½ (i.e., one extended-precision product may be produced every other cycle). It is noted that in the illustrated embodiment, each extended-precision multiply has a fixed latency that is not influenced by factors such as result rounding or denormal results. It is further noted that in alternative embodiments, multiplier 200 may employ a different number of pipeline stages, and extended-precision multiplication operations may have a different latency.

Figure 4:
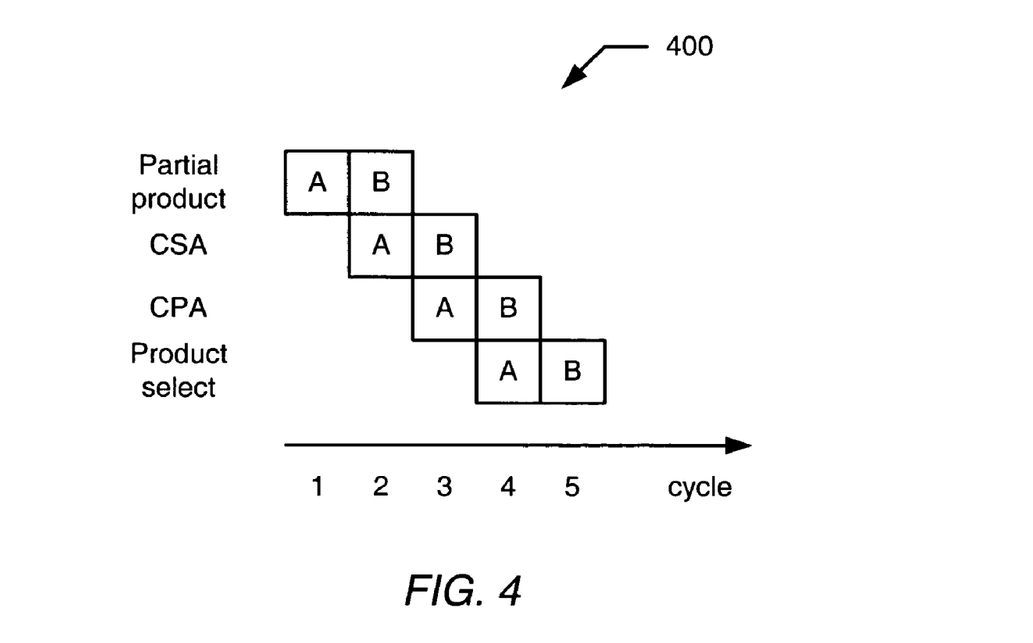
FIG. 4 is a pipeline diagram illustrating the flow of reduced-precision multiplication operations through one embodiment of a floating-point multiplier.

Turning now to FIG. 4, a pipeline diagram illustrating the flow of reduced-precision multiplication operations through one embodiment of a floating-point multiplier is shown. Pipeline diagram 400 depicts four pipeline stages along the vertical axis denoted "partial product," "CSA," "CPA," and "product select." These pipeline stages may correspond to stages and phases of multiplier 200 execution as described above. Pipeline diagram 400 depicts a progression of clock cycles along the horizontal axis and illustrates the progression in time of two reduced-precision multiplication operations denoted "A" and "B," each configured to multiply an N-bit multiplicand value by an S-bit multiplier value, where S is a positive integer less than or equal to N/2. For clarity of explanation, the following discussion assumes that the execution phases described above correspond directly to respective pipeline stages. However, as noted above, in alternative embodiments a given pipeline stage may correspond to portions of more than one of the above-described execution phase.

Referring collectively to FIG. 2 and FIG. 4, in cycle 1 of pipeline diagram 300, multiplication A enters the single partial product execution phase. During this phase, partial products corresponding to the reduced-precision multiplier may be generated. During cycle 2, multiplication A enters the single carry save adder execution phase, wherein the partial products produced during the previous cycle may be accumulated to a reduced-precision redundant product. During cycle 3, multiplication A enters the single carry propagate adder execution phase, wherein the reduced-precision redundant product may be reduced to the reduced-precision multiplicative product in carry propagate adder 240 as well as to a plurality of rounded reduced-precision multiplicative products in rounding adders 245. Finally, in cycle 4, multiplication A enters the product selection phase, wherein one of the reduced-precision multiplicative products generated in cycle 3 may be selected as the final multiplicative product.

Pipeline diagram 400 shows multiplication B entering the pipeline immediately following A, and following the same sequence of execution phases. However, multiplication B may enter the pipeline at any time after multiplication A. In the illustrated embodiment, the latency of each reduced-precision multiplication operation is four cycles, and the maximum throughput of such operations is 1 (i.e., one reduced-precision product may be produced every cycle). It is noted that in the illustrated embodiment, each reduced-precision multiply has a fixed latency that is not influenced by factors such as result rounding or denormal results. It is further noted that in alternative embodiments, multiplier 200 may employ a different number of pipeline stages, and reduced-precision multiplication operations may have a different latency.

Figure 5:
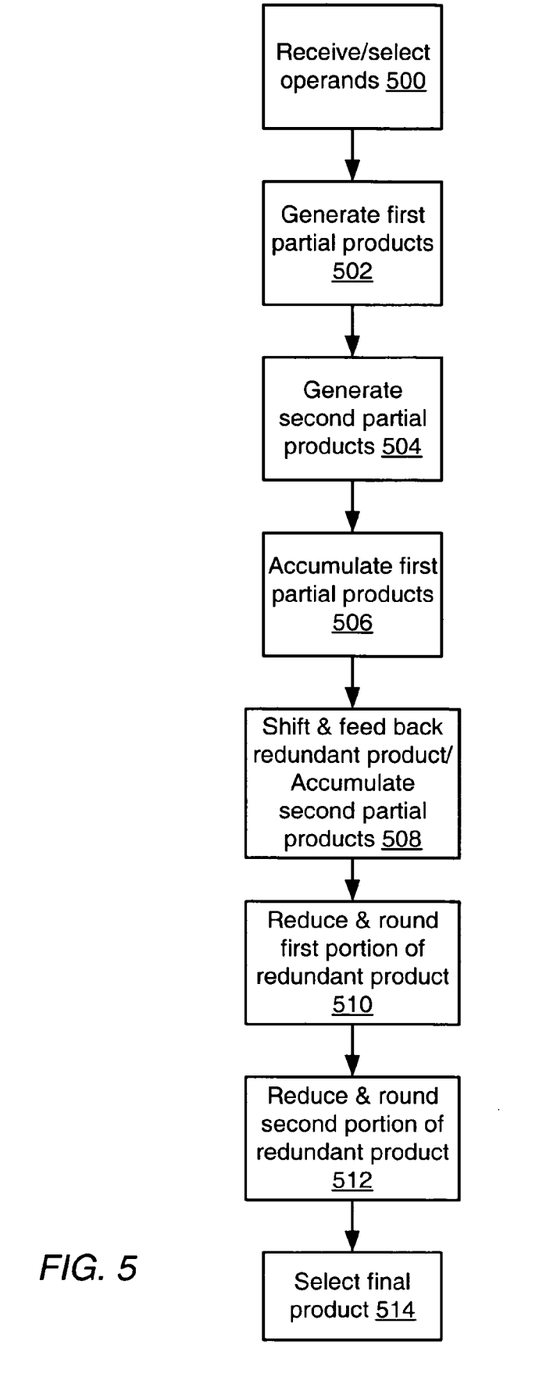
FIG. 5 is a flow diagram illustrating operation of extended-precision multiplication operations in one embodiment of a floating-point multiplier.

Turning now to FIG. 5, a flow diagram illustrating operation of extended-precision multiplication operations in one embodiment of a floating-point multiplier is shown. Referring collectively to FIG. 2 and FIG. 5, operation begins in block 500 where multiplicand selection logic 215 and multiplier selection logic 210 select an N-bit multiplicand value and an M-bit multiplier value from a plurality of input operands, respectively. During a first partial product execution phase, partial product generation logic 220 may generate a plurality of partial products corresponding to a first portion of the multiplier value (block 502). During a second partial product execution phase, partial product generation logic 220 may generate a plurality of partial products corresponding to a second portion of the multiplier value (block 504).

During a first carry save adder execution phase, carry save adder logic 230 may accumulate the partial products generated during the first partial product execution phase into a redundant product value (block 506). During a second carry save adder execution phase, carry save adder logic 230 may arithmetically shift left the redundant product accumulated during the first carry save adder execution phase by a number of bits corresponding to the first portion of the multiplier value, and may accumulate the resulting shifted redundant product along with the partial products generated during the second partial product execution phase into the redundant product (block 508).

During a first carry propagate adder execution phase, carry propagate adder 240 may reduce a first portion of the redundant product to a multiplicative product, and rounding adders 245 may reduce a first portion of the redundant product along with a plurality of respective rounding constants to a plurality of rounded multiplicative products (block 510). The first carry propagate adder execution phase may begin after the second carry save adder execution phase completes. During a second carry propagate adder execution phase, carry propagate adder 240 may reduce a second portion of the redundant product to a multiplicative product, and rounding adders 245 may reduce a second portion of the redundant product along with a plurality of respective rounding constants to a plurality of rounded multiplicative products (block 512). Finally, product selection logic 250 may select a final multiplicative product as the result output of multiplier 200 (block 514).

It is noted that in some embodiments, the execution of some operational steps may be overlapped with others. Further, in some embodiments a different number of execution phases may be used to operate any given portion of logic of multiplier 200.

Optimized Extended-Precision Division

In some implementations of floating-point arithmetic, operations such as division and square root may be approximated through successive multiplication operations. For example, a division operation N/D may be approximated by the multiplication operation NR. R is an estimate of the value 1/D accurate to a given number of bits E; thus NR may give an estimate of the quotient accurate to the same given number of bits E. For some division algorithms, the estimates R and NR may be refined through successive stages of multiplication operations, wherein the number of bits of accuracy doubles after each stage. In one embodiment, the initial estimate of R may be accurate to 15 bits and three stages of multiplication operations comprising six floating-point multiplications may be employed to obtain the quotient N/D as well as a remainder value. After the third stage of multiplication operations, the accuracy of N/D for this embodiment may be on the order of 60 bits, reflecting two doublings of the initial accuracy of R. This accuracy may be sufficient to represent division of a 53-bit dividend by a 53-bit divisor, the level of precision specified by IEEE 754 double precision arithmetic.

As illustrated above in FIG. 3, multiplier 200 may not operate in a fully pipelined mode when configured to perform extended-precision arithmetic. That is, in the illustrated embodiment some pipeline stages may be used twice in successive cycles for a given extended-precision multiplication operation, and therefore may not be available to execute a new extended-precision multiplication operation each cycle. In the illustrated embodiment of multiplier 200, hardware requirements are reduced versus a fully pipelined extended-precision multiplier implementation. Consequently, in this embodiment, latency of extended-precision multiplication is higher (6 cycles) and throughput lower (½) than the reduced-precision mode illustrated in FIG. 4.

In one implementation of the three-stage division algorithm described above, double-precision multiplication may be used throughout the algorithm. However, it is noted that in the first stage of the described embodiment of the algorithm, a 53-bit double-precision dividend may be multiplied by a 15-bit estimate of the reciprocal of the divisor. In the second stage, estimation accuracy may be doubled, and the multiplication operands may have 53 bits and 30 bits of precision, respectively. As described above in conjunction with the descriptions of FIG. 2 and FIG. 4, in one embodiment multiplier 200 may be configured to perform reduced-precision multiplication of a 76-bit multiplicand value by a 38-bit multiplier value in a fully pipelined mode of operation with 4 cycle latency and throughput of 1. Therefore, in a second implementation of the three-stage division algorithm described above, reduced-precision multiplication may be used during the first two stages of the algorithm, where the number of bits of precision of the reciprocal estimation is less than the number of bits of multiplier value precision that may be available in reduced-precision multiplication mode. The overall latency of deriving a quotient and remainder using the second algorithm implementation may consequently be lower than the first implementation, thereby improving division performance.

In other embodiments, it is contemplated that extended- and reduced-precision multiplication operations with different performance characteristics and levels of precision other than those described above may be combined in a similar fashion to increase the performance of additional numerical algorithms, such as algorithms for estimating transcendental floating-point functions, for example.

Figure 6:
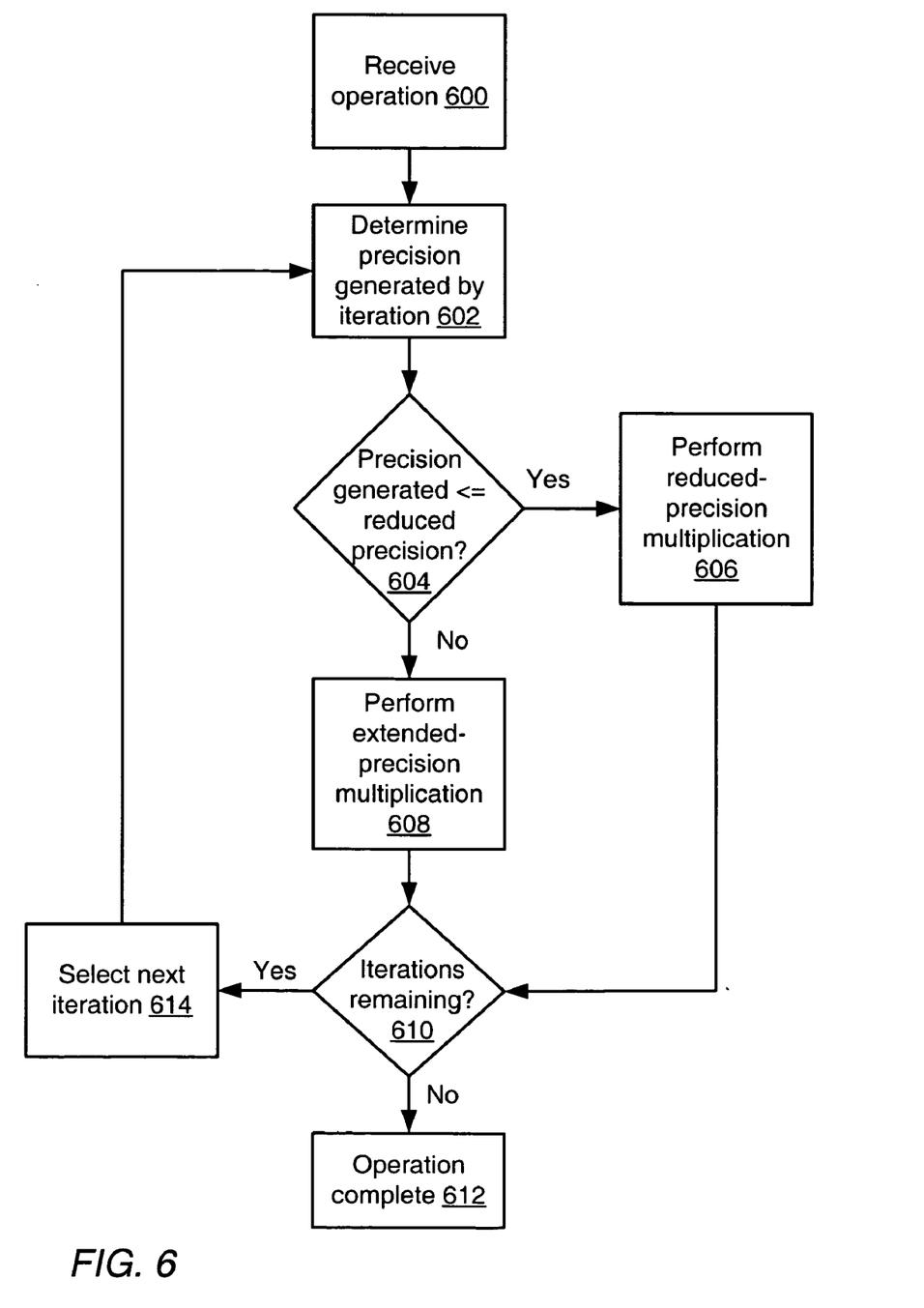
FIG. 6 is a flow diagram illustrating operation of extended-precision floating-point arithmetic operations in one embodiment of a floating-point multiplier.

Turning now to FIG. 6, a flow diagram illustrating operation of extended-precision floating-point arithmetic operations in one embodiment of a floating-point multiplier is shown. Referring collectively to FIG. 2 through FIG. 4, operation begins in block 600 where an extended-precision floating-point arithmetic operation is received. In one embodiment, the arithmetic operation may be a double-precision divide operation such as described above, while in other embodiments, the arithmetic operation may be a transcendental estimation operation or a different operation. In the illustrated embodiment, the received arithmetic operation may be performed a plurality of iterations of a set of floating-point operations, which set may include at least one floating-point multiplication operation. In some embodiments, a given iteration may include additional floating-point or non-floating-point operations.

For each iteration, multiplier 200 may be configured to determine an arithmetic precision generated at that stage. Each operand as well as the result may have a precision associated with it. For example, multiplier 200 may be configured to determine that the quotient precision generated after multiplying a 53-bit multiplicand value by a 15-bit multiplier value during the first iteration of a received divide operation is 15 bits, though in other embodiments these precision values may differ. In some embodiments, the arithmetic precision generated at each iteration of the received arithmetic operation may be hardwired into control logic such as control logic 201, while in other embodiments, it is contemplated that the generated precision may be indicated by a control mechanism external to multiplier 200 or a software mechanism such as microcode, for example (block 602).

After the generated arithmetic precision for the given iteration has been determined, multiplier 200 may determine whether the generated arithmetic precision is less than or equal to the precision of a reduced-precision multiplication operation (block 604). For example, multiplier 200 may be configured to perform a reduced-precision multiplication of a 76-bit multiplicand value by a 38-bit multiplier value as depicted by pipeline diagram 400.

If the generated arithmetic precision is less than or equal to the precision of a reduced-precision multiplication operation, multiplier 200 may perform one or more reduced-precision multiplication operations during the given iteration (block 606). Using the example cited above, in the case of multiplying a 53-bit multiplicand value by a 15-bit multiplier value to generate a 15-bit quotient estimate, each operand as well as the result has a precision less than or equal to the corresponding operand and result of the reduced-precision 76-bit by 38-bit multiplication. If the generated arithmetic precision is greater than the precision of a reduced-precision multiplication operation, multiplier 200 may perform one or more extended-precision multiplication operations during the current iteration (block 608). For example, if the arithmetic precision generated during a given iteration requires 53 bits for the multiplicand value and 53 bits for the multiplier value, multiplier 200 may be configured to select a reduced-precision multiplication of a 76-bit multiplicand value by a 76-bit multiplier value as depicted by pipeline diagram 300 for this case.

After the appropriate precision multiplication operation has been performed, multiplier 200 may determine whether further iterations remain to be computed for the received arithmetic operation (block 610). If no iterations remain, the received arithmetic operation may be complete (block 612). If iterations remain, multiplier 200 may be configured to select the next iteration (block 614) and continue operation from block 602.

It is noted that in other embodiments, different precision values may be employed by the iterations of the received arithmetic operation, and different precision values may be provided by the reduced- and extended-precision multiplication operations. In such embodiments, the latencies and throughputs of such multiplication operations may also differ from those illustrated above.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A floating point multiplier circuit configured for performing extended-precision multiplication of an N-bit multiplicand value by an M-bit multiplier value, wherein N and M are positive integers, said floating point multiplier circuit comprising:

partial product generation logic configured to generate a plurality of partial products from said multiplicand value and said multiplier value, wherein said plurality of partial products corresponds to a first portion of said multiplier value during a first partial product execution phase, and wherein said plurality of partial products further corresponds to a second portion of said multiplier value during a second partial product execution phase;

a plurality of carry save adders coupled to said partial product generation logic and configured to accumulate said plurality of partial products generated during said first partial product execution phase into a redundant product during a first carry save adder execution phase, and further configured to accumulate said plurality of partial products generated during said second partial product execution phase into said redundant sum during a second carry save adder execution phase; and a first carry propagate adder coupled to said plurality of carry save adders and configured to reduce a first portion of said redundant product to a multiplicative product during a first carry propagate adder phase, and further configured to reduce a second portion of said redundant product to said multiplicative product during a second carry propagate adder phase;

wherein said first carry propagate adder phase begins after said second carry save adder execution phase completes.

2. The floating point multiplier circuit as recited in claim 1, wherein:

said plurality of carry save adders is further configured to perform an arithmetic left shift on said redundant product accumulated during said first carry save adder execution phase by a number of bits corresponding to said first portion of said multiplier value; and said plurality of carry save adders is further configured to accumulate a result of said arithmetic left shift with said second portion of said plurality of partial products into said redundant product during said second carry save adder execution phase.

3. The floating point multiplier circuit as recited in claim 1, wherein:

said first portion of said multiplier value corresponds to a higher-order portion of said multiplier value;

said second portion of said multiplier value corresponds to a lower-order portion of said multiplier value;

said first portion of said redundant product corresponds to a lower-order portion of said redundant product; and said second portion of said redundant product corresponds to a higher-order portion of said redundant product.

4. The floating point multiplier circuit as recited in claim 1, wherein:

said redundant product includes a Q-bit sum term and an R-bit carry term;

said first carry propagate adder includes a plurality of operand inputs, wherein each operand input includes at most P bits; and each of P, Q, and R is a positive integer, P is less than Q, and P is less than R.

5. The floating point multiplier circuit as recited in claim 1 further comprising a plurality of rounding adders coupled to said plurality of carry save adders and configured to produce a respective plurality of rounded multiplicative products.

6. The floating point multiplier circuit as recited in claim 5, wherein each rounding adder is further configured to:

receive a respective rounding constant;

accumulate said respective rounding constant with a first portion of said redundant product into a rounded redundant product during said first carry propagate adder phase;

reduce a first portion of said rounded redundant product to a given respective rounded multiplicative product during said first carry propagate adder phase; and reduce a second portion of said rounded redundant product to said given respective rounded multiplicative product during said second carry propagate adder phase.

7. The floating point multiplier circuit as recited in claim 1, further configured for performing pipelined reduced-precision multiplication of said N-bit multiplicand value by an S-bit multiplier value with a single partial product execution phase, a single carry save adder execution phase, and a single carry propagate adder phase, wherein S is a positive integer and S is less than or equal to N/2, and wherein each of said single partial product execution phase, said single carry save adder execution phase, and said single propagate adder phase is operable to accept a new reduced-precision multiplication operation during a given execution cycle.

8. The floating point multiplier circuit as recited in claim 1, wherein said partial product generation logic includes a plurality of Booth encoders and a plurality of Booth multiplexers.

9. The floating point multiplier circuit as recited in claim 1, wherein M is equal to 2Y, wherein said first portion of said multiplier value includes the most significant Y bits of said multiplier value, and wherein said second portion of said multiplier value includes the least significant Y bits of said multiplier value.

* * * * *